United States Patent Office 3,055,791
Patented Sept. 25, 1962

3,055,791
PROCESS FOR DEWAXING PAPER AND RECLAIMING CELLULOSIC FIBER
Robert T. Elias, Potsdam, N.Y., assignor to Minerals & Chemicals Philipp Corporation, a corporation of Maryland
No Drawing. Filed Oct. 27, 1959, Ser. No. 848,910
6 Claims. (Cl. 162—4)

This invention relates to the reclamation of cellulosic fiber from waste or scrap paper, board or the like and is a continuation-in-part of copending U.S. patent application Serial No. 615,749, filed October 15, 1956. The present invention relates particularly to a process for removing wax or other normally solid organic coating or impregnating substance from waste or scrap cellulosic fiber sheet material so as to put the sheet material in a form in which its cellulosic fiber content is readily reclaimable, as by repulping and forming the repulped fiber into a new sheet.

A diagrammatic representation of the process of this invention is as follows:

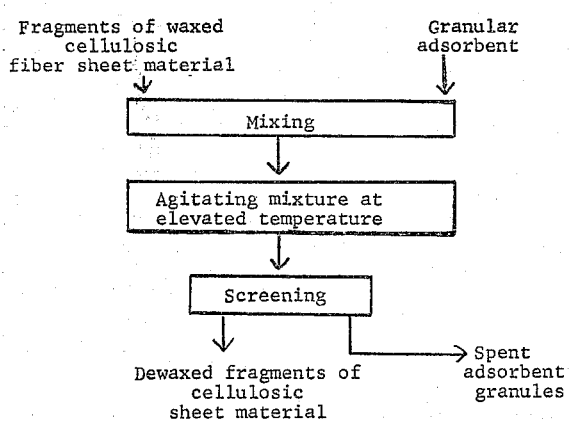

In the manufacture of waxed paper, polyethylene and other moisture barrier coated paper or board, and in the production of paper cups, food packages and the like therefrom, large quantities of waste or scrap trimmings or "broke" are inherently formed, which adversely affects manufacturing costs. In addition, billions of used waxed milk cartons and the like are discarded each year. While the fiber content of these waste materials is frequently of very high quality, heretofore it generally has been put to no better use than to be burned or otherwise destroyed.

The boxboard industry as well as the de-inking industry carefully avoid using or processing this waste coated paper into new paper or board. The reason, among other things, is that in the digesting or cooking operation of de-inking mills, the coated material melts, but is not destroyed, with the result that the melted wax collects ink pigments and dirt and gathers into balls and droplets which not only foul up the equipment but when the new paper is formed it melts, causing unsightly and greasy spots. For these reasons paper containing more than about 1% by weight of wax or other organic coating material is considered to be unsuitable for reclamation.

Unsuccessful attempts have been made in the past to develop a commercial process for reclaiming the high quality fiber of waste or scrap coated paper and board. A great deal of effort has been directed toward solvent extraction of the organic coating material. However, there remains the problem of separating the wax from the solvent for recovery of the latter, as well as elimination of solvent from the fiber. Moreover, the danger of fire and explosion is ever present.

Removal of the organic coating by emulsification has also been attempted without appreciable success. Many materials have been suggested as the emulsifying agent. The earliest attempts of this sort were made prior to the introduction of synthetic organic surface active agents and involved the use of a swelling colloidal bentonite clay in aqueous media, in which case the bentonite functioned much like a synthetic surface active agent in emulsifying the organic coating material. Paper and board today is coated with a wide variety of waxes and other organic materials, as well as mixtures of them. Wax emulsions being extremely sensitive and difficult to maintain, commercial use of the proposed emulsion processes is not practical because of these variations in coating formulations.

Accordingly, one object of my invention is to provide a process for removing a normally solid organic coating from waste paper or board, which process overcomes the aforementioned difficulties.

Another object of the invention is to provide a simple and economic method of regenerating waste or scrap paper or board in a form suitable for use in papermaking from waste cellulosic fiber sheet material which is coated or impregnated with wax or other organic substance or mixture of organic substances which are liquefiable at a temperature below the temperature at which the fiber spontaneously chars.

Other objects and features of the invention will be apparent from the detailed description which follows.

I have discovered a novel dry process for treating sheeted cellulosic fibrous material which is coated with wax or the like to remove the coating from the sheet in a manner such as to leave the sheeted material in a form suitable for the reclamation of its cellulosic fiber content. My invention will be described with particular reference to its application to the dewaxing of wax coated paper although it is equally applicable to the removal from paper (or other sheet material comprising cellulosic fiber) of a variety of normally solid organic coating agents provided such coating agents are liquefiable below the temperature at which the paper chars. As used in the specification and in the appended claims, the terms "coated" and "coating" and similar expressions mean impregnation as well as surface coating.

Stated briefly, the process of the invention comprises contacting fragments of paper coated with a normally solid, heat liquefiable organic coating, especially wax, with granules of a solid adsorbent material, utilizing a substantial amount of adsorbent relative to the fragments so as to form a mixture in which the fragments are suspended in a bed of the adsorbent particles. Such mixture is agitated, as by tumbling, while maintaining the fragments and granules in intimate contact above the temperature at which the normally solid organic coating is liquefied but below the temperature at which the paper chars, as a result of which the organic coating is sorbed by the adsorbent granules. The fragments of paper employed in the process are larger than the granules of adsorbent. The adsorbent granules are free from very fine particles which are detrimental to the satisfactory operation of the process because of their tendency to cling to and contaminate the dewaxed fragments. The fragments depleted of wax are then separated from the adsorbent containing sorbed organic coating material; this separation is readily and efficiently accomplished by taking advantage of the difference in size between the granules of adsorbent and the fragments. The process is a dry one in the sense that the fragments are not surrounded by an added liquid phase, such as water or an organic solvent, during their contact with the adsorbent granules; in fact, the only liquid essential to the processing is the liquefied organic coating material.

The fragments dewaxed in such a manner are not bruised and their cellulosic fibers are undamaged and are free from deleterious foreign substances, liquid or solid. Such fragments are amenable to repulping in order to reclaim their valuable cellulosic fiber content.

From the brief description of my invention, it is apparent that the process of the present invention affords a simple, efficient method of separating paper from a normally solid substance coating the paper without resorting to the use of solvents and emulsifying agents for the coating substance. Apparently nobody, prior to my discovery, considered an adsorption contact method a suitable approach to the dewaxing of paper or the like. Indeed, this is not surprising since I have found that satisfactory results are obtained only when the dewaxing by adsorption is carried out in a manner which constitutes a departure in many respects from the teachings of the prior art.

The prior art teaches the necessity of using finely divided or powdered substances for efficient transfer of a sorbable normally solid material from one solid to another. A characteristic of finely divided solids is that they cling, often tenaciously, to other solids, as is well known. Through careful control and selection of conditions during the adsorption contact step, I am able to dewax paper efficiently with coarse (i.e., granular) adsorbent particles, rather than fine adsorbent particles, so that the dewaxed paper separates readily and completely from the adsorbent particles without application of strong mechanical forces (such as attrition or beating) which could either damage the fiber content of the dewaxed paper, tear the dewaxed paper into particles too fine to handle or separate from adsorbent particles or result in disintegration of the adsorbent granules.

The specific conditions I employ in dewaxing with a granular adsorbent are different from conditions employed in commercial adsorption processes utilizing granular adsorbents. In commercial adsorption operations, such as in the decolorization of wax, one of two general methods is employed. One is a batch method and involves passing liquefied feed containing sorbable components into contact with a stationary or fixed bed of adsorbent granules. The other and newer method is a continuous method and involves continuously passing liquefied feed countercurrently to a moving bed of adsorbent particles. In both methods the adsorbent particles are in the form of a bed in which the granules are maintained in fixed relationship to each other during the contact process. In my process, in contrast, the granules of adsorbent must be in a continuous state of agitation during the contact process. To the best of my knowledge only powdered solids have been considered suitable for use in an adsorption process in which the adsorbent is agitated during the contact step.

More specifically, the solid adsorbent I employ is any microporous inorganic solid having a large surface area and high adsorptive capacity for liquid organic compounds and is usually a siliceous, aluminous or aluminosilicate material. Certain naturally occurring materials are suitable in the raw state, i.e., after merely being dried; usually, however, the raw material is activated by heat and/or acid treatment to render it an effective adsorbent, as is known to those skilled in the art. Activated attapulgite clay, which is preferred adsorbent because of its efficiency in the process, is prepared by heating Georgia-Florida fuller's earth or other clayey material which is composed chiefly of the clay mineral attapulgite, at a temperature of about 800° F. to reduce the volatile matter of the earth to about 1% to about 6%; the activation destroys the normal colloidal properties of the earth and, in addition, increases its sorptive capacity and hardens the material so that it is less likely to disintegrate during handling and use. The activation of attapulgite clay is described in detail in an article entitled "Thermal Activation of Attapulgus Clay" by W. S. W. McCarter et al. which appears in "Industrial and Engineering Chemistry," vol. 42, pages 529–533 (March 1950). Another suitable contact adsorbent is sub-beintonite clay, a non-colloidal calcium montmorillonite, which is preferably acid leached, in accordance with methods well known to those skilled in the art. It will be noted, however, that Wyoming bentonite, a colloidal sodium montmorillonite mineral, is not an adsorbent and is not useful in the practice of my invention, as is sub-bentonite. Acid activated kaolin clays, such as are employed in the catalytic conversion of hydrocarbons, are also useful as are adsorbents prepared from halloysite clay by acid treatment followed by impregnation with alumina gel. Also useful are activated grades of bauxite, as well as active synthetic aluminas, synthetic aluminum silicates, activated zeolites, especially those of the type usually referred to as "molecular sieves," silica gel, perlite, vermiculite and activated sepiolite clay. The aforementioned materials are illustrative only and other adsorbents may be used.

The adsorbent is employed in the form of granules which are sufficiently small to sorb effectively the wax from the paper but which are substantially free from very fine particles which will cling to the dewaxed paper fragments. It is important to use granules which are sufficiently resistant to attrition that they may be agitated with the paper fragments without disintegrating into fines. It is preferable to employ granules which may be regenerated without loss of sorptive capacity and without disintegrating. The granules are substantially all as fine or finer than about 20 mesh (U.S. standard sieve) and are substantially free from particles finer than about 80 mesh. Such a material is usually designated as 20/80 mesh material. Particles coarser than about 20 mesh are not as effective as finer granules. In some instances 80 mesh material is too fine and may be difficult to separate from the dewaxed paper and particles no finer than those retained on a 60 mesh screen will give better results. A preferred particle size adsorbent is a 30/60 mesh adsorbent. Such an adsorbent is small enough to insure good contact with the fragments but is sufficiently coarse that it can be readily shaken from the dewaxed paper and separated therefrom by screening. It will be appreciated that the particle size of the adsorbent I employ is distinctly granular, as opposed to a fine dust or powder.

The adsorbent particles are preferably dry and the presence of moisture in the adsorbent and the generation of steam therefrom at the elevated temperature employed in the contact step serves no useful purpose.

I will now describe my process as applied to the reclamation of cellulose fiber from waxed paper broke. It is to be understood that my invention has much broader application and may be employed for reclaiming cellulosic fiber from any cellulosic fibrous material coated with a normally solid organic substance which is liquefiable at a temperature below the temperature at which the fiber spontaneously chars.

In accordance with my process, the waste waxed paper sheets are cut, shredded or otherwise divided into fragments of a suitable size for subsequent treatment with the granular adsorbent. The fragments should be sufficiently small that intimate contact may be maintained between all surfaces of paper and adsorbent. I have found that if the fragments are too large or too elongated there will be a tendency during agitation for the pieces to become folded or to become entangled and form balls, as a result of which the contact between the surfaces of the fragments and the adsorbent granules will be impaired. The smallest dimension of the fragments must be greater than the diameter of the largest adsorbent granule employed so that these materials may be separated by screening. I prefer to cut the paper into pieces having a maximum dimension not greater than about 2 inches and a minimum dimension not less than about ⅛ inch, such as, for example, strips ¼ inch by 1½ inches. The area of the fragments should not exceed about 1 square inch. Confettilike fragments about ¼ inch by ¼ inch or ½ inch by ½ inch are particularly recommended since they resist being folded and are still coarse enough to be separable from the largest adsorbent granules. Difficulty may be experienced in shredding paper to a width less than about ¼ inch. When the waxed paper is relatively stiff, fragments somewhat larger than those described above may be employed successfully.

The fragmented paper is then brought into contact with the solid adsorbent. While the amount of adsorbent used can be varied over a wide range, it is desirable to employ at least a sufficient amount to assure intimate contact with all paper surfaces during the treatment cycle. For economic reasons it is usually desirable to use the minimum amount of adsorbent which will reduce the total organic coating of the sheet to 1% by weight or less. The minimum quantity of adsorbent relative to fragments will vary with the original wax content of the fragments, the size of the granules and fragments, the contact time and to a lesser extent the contact temperature, as well as whether fresh or reused adsorbent is employed. In most instances a weight ratio of adsorbent of from about 3:1 to about 20:1 is satisfactory although in certain instances the adsorbent to paper weight ratio may be as low as 1:1. Ratios higher than 20:1 may be utilized although the economics of the process will not be as favorable as when less adsorbent is used. A preferred weight ratio of adsorbent to clay is within the range of 5:1 to 15:1.

The adsorbent and paper fragments are maintained in intimate contact at an elevated temperature, sufficient to melt the wax but below the temperature at which the paper chars. Under these conditions, the wax is adsorbed on the adsorbent material, and this contact is maintained until substantially all of the wax is removed, leaving the paper fragments in a form in which its cellulosic fiber content may be reclaimed through repulping. The temperature to which the intimately mixed adsorbent and paper fragments is subjected depends, of course, on the nature or composition of the coating material, as well as the cellulosic fiber. For most purposes a temperature of from about 220 to 275° F. will be sufficient to melt the coating substance; however, a higher temperature may be employed, when desirable, as long as it does not cause spontaneous charring or carbonization of the cellulosic fiber. Further, I have found that the wax will be sorbed from the paper within a relatively short time, such as from about 5 to 20 minutes. Longer contact periods, of course, may be used sometimes to advantage and in any case will not adversely affect the results.

Continuous agitation of the dry mixture of adsorbent and paper fragments while they are being maintained in intimate contact is essential to facilitate the desired sorption of the wax. This may be accomplished in any suitable manner, for example, in a cement mixer, or in a rotating horizontally disposed drum or cylinder which is indirectly fired to maintain the temperature at the desired level and preferably contains flights to promote agitation. Good results have been obtained when a rotary drum was filled with paper fragments and adsorbent to about 40% of its capacity. The agitation must not be so violent as to tear the fragments or disintegrate the adsorbent granules.

The dewaxed paper fragments are then separated from the adsorbent granules, with or without cooling the mixture. This may be accomplished simply by shaking the mixture over a screen, such as on a vibrating screen, although other methods for separating particles of different size may be employed. The adsorbent particles, being substantially smaller than the fragments, are readily separated during screening leaving behind the paper fragments which are substantially free of both wax and adsorbent particles containing waxy sorbate. The fragments are then repulped to reclaim their cellulosic fiber content.

For economic reasons it is preferable to recycle the adsorbent several times in a treatment of subsequent batches of waxed paper fragments. Frequently, the adsorbent may be recycled advantageously as many as five times or more, until it is spent.

While the spent adsorbent may be discarded, I have found it advantageous to regenerate or revivify the adsorbent in any one of a number of ways which will be apparent to those skilled in the art. The simplest method of accomplishing the regeneration is to burn off the sorbed wax, such as in a rotary kiln. An alternative method of regeneration, which is particularly advantageous when treating substantial quantities of spent adsorbent, is to remove and recover the wax by solvent extraction or by steaming. An obvious advantage of this procedure is that the recovered wax may be used in the preparation of new wax paper or may be marketed for other purposes.

One embodiment of my invention contemplates the production of paper from the reclaimed cellulosic fiber. This is accomplished in accordance with my process simply by repulping the dewaxed fragments in water to form a suspension of the cellulosic fiber content thereof, following which the repulped fiber is formed into a sheet in accordance with known procedures, usually with or without the addition of a filler, adhesive, sizing material or other conventional additive. Thus the repulped fiber may be formed into paper or board with the use of a Fourdrinier paper machine or a cylinder paper or board machine.

It should be pointed out that uncoated paper and the like is made up chiefly of cellulose fiber; however, other materials are usually added to impart special properties to the finished paper. For example, titanium dioxide is frequently added to improve the color of paper; fillers such as calcium carbonate and certain clays are usually added, as well as an adhesive such as starch. Rosin and the like are used as a sizing ingredient. Such additives to the cellulose fiber may be regenerated with the cellulosic fiber during repulping if desired. Many waxed papers are also printed. The printing ink will not be removed during the adsorption process unless a thermoplastic ink has been used.

The following examples are given for the purpose of illustrating my invention.

EXAMPLE I

This example illustrates the dewaxing of broke from bubble gum wrapper containing 18.5% wax and 6.4% polyethylene in accordance with the method of the invention.

The broke was shredded into strips somewhat smaller than 1 square inch in an impact mill equipped with knife blade hammers. The strips were charged at a uniform rate of 6 lbs. per hr. together with 30/60 mesh granules of activated attapulgite clay at 120 lbs./hr. to a rotary steam tube dryer (1 ft. diameter by 8 ft. long). The steam tube dryer had a revolving shell with a bundle of steam tubes which extended the full length of the shell in two concentric rows parallel to the shell axis. The tubes, which functioned also as flights during the operation of the dryer, were located near the inner shell wall and were mounted at one end in a steam distributing head and at the other end they were loosely supported in a plate free to expand. The heat was transferred to the clay-broke mixture by the steam flowing inside the tubes. The steam tube dryer was heated to produce a product discharge temperature of 260–265° F. The average residence time of the clay-broke mixture in the rotary dryer was seventeen minutes.

The dryer product was sifted over a 4 mesh screen to separate the strips of dewaxed paper from adsorbent clay particles.

The wax content of the dewaxed strips was determined by the TAPPI Standard Method T–405 M–45 in which petroleum ether was used as the solvent; the polyethylene content was analyzed by the same procedure using carbon tetrachloride as the solvent.

The dewaxed paper was found to contain 0.7% wax and 0.1% polyethylene and had good fiber strength, this showing that by my process broke containing a substantial quantity of a wax-polyethylene coating mixture may be reclaimed in a condition suitable for use in papermaking.

EXAMPLE II

This example illustrates the dewaxing of various wax coated and impregnated paper brokes by a clay adsorbent in accordance with the method of the invention. The brokes employed included wax coated and impregnated paper and board such as food containers, kitchen wax paper, paper cups and bread wrappers. 30/60 mesh activated attapulgite clay was the adsorbent.

Each broke was initially shredded in a swing type impact mill equipped with knife blades into strips smaller than ¼" to 2". The dewaxing was carried out in a 12" diameter, 15" long hollow steel cylinder equipped with lifting flights. The cylinder revolved about a horizontal axis at 10 r.p.m. and was heated externally with natural gas flames. The clay and strips of waxed paper broke were charged to the cylinder and heat applied for various time intervals. The temperature of the bed of mixture was recorded by means of a thermocouple. After this treatment, the paper strips were separated from the adsorbent clay by sifting on a 4 mesh screen and the wax and polyethylene contents were determined by the TAPPI procedure. Some of the variables investigated included clay loading (expressed as the weight ratio of clay to waxed paper), contact temperature and time.

The results of the experiments which are reported in Table I show that brokes containing as much as 27% by weight of wax were dewaxed to levels below 1%. Polyethylene was also effectively removed from the paper by the adsorbent clay. In each instance substantially complete separation of adsorbent granules from the dewaxed strips was obtained by the screening operation.

*Table I*

DEWAXING OF COATED AND IMPREGNATED WAXED PAPER BROKES WITH ACTIVATED ATTAPULGITE CLAY ADSORBENT

| Broke | Before dewaxing | | Clay loading | | Contact time, min. | Dewaxed fiber | |
|---|---|---|---|---|---|---|---|
| | Wax content, weight percent | Polyethylene content, weight percent | Parts clay/part broke weight basis | Temp. °F. | | Wax content, weight percent | Polyethylene content, weight percent |
| Solid bleached waxed carton | 8.0 | | 3/1 | 250 | 20 | 0.67 | |
| Waxed paper (frozen food overwrap) | 25.0 | | 2/1 | 250 | 10 | 0.52 | |
| Kitchen waxed paper | 21.0 | | 3/1 | 250 | 10 | 0.40 | |
| Waxed bread wrapper | 27.0 | | 10/1 | 240 | 20 | 0.40 | |
| Waxed paper broke | 26.0 | 2.00 | 20/1 | 240 | 20 | 0.87 | 0.28 |
| Waxed paper cups | 5.3 | 1.00 | 20/1 | 250 | 20 | 0.04 | 0.12 |

EXAMPLE III

Experiments were conducted which illustrated the necessity for shredding waxed paper broke to a size which would not result in tangling during the dewaxing operation. The broke employed was from bread wrapper and analyzed 27% by weight of wax. The shredding, contacting and separation equipment of Example II were employed.

Waxed paper broke fragments which were 18" long and about ¼" wide were dewaxed to a level of 2.7% wax when tumbled in the rotary dryer in the presence of 10 parts by weight of 30/60 mesh activated attapulgite clay per part of shreds at 250° F. for 20 minutes and then screened. When the same broke was shredded to about 2" by ¼" and processed in the same manner with the same clay loading, temperature and contact time, the wax content of the product was 0.4% by weight.

EXAMPLE IV

This example illustrates the use of an acid-activated kaolin clay adsorbent in the dewaxing of 2" by ¼" shreds of kitchen waxes paper broke in accordance with my invention. The clay used was a 30/60 mesh fraction of Kaosorb, a sulfuric acid-reacted thermally desulfated kaolin clay which is processed and supplied by Minerals & Chemicals Corporation of America under such trademark. The equipment and procedure employed is described in Example II. Experiments were conducted at various clay loadings, contact times and temperatures, with the results tabulated in Table II.

*Table II*

THE EFFECT OF CLAY LOADING, TEMPERATURE AND CONTACT TIME ON THE DEWAXING CAPACITY OF GRANULAR ACID-ACTIVATED KAOLIN CLAY ADSORBENT

[Dewaxing of waxed paper broke containing 20-21% wax]

| Parts adsorbent/part broke, weight basis | Contact time, minutes | Temp., °F. | Wax content of dewaxed fiber, weight percent |
|---|---|---|---|
| 2/1 | 10 | 270 | 2.04 |
| 2/1 | 20 | 250 | 2.60 |
| 3/1 | 20 | 250 | 0.63 |
| 5/1 | 5 | 250 | 0.95 |
| 5/1 | 10 | 250 | 0.35 |
| 5/1 | 20 | 250 | 0.22 |

The results show that at least 3 parts of Kaosorb adsorbent per part of broke was required to reduce the wax content of the broke below 1% and that, all other variables being constant, increased adsorbent-broke contact time facilitated wax sorption.

EXAMPLE V

Experiments were conducted to illustrate the importance of using a relatively coarse granular adsorbent rather than a finely divided adsorbent in the dewaxing of paper in accordance with my invention. The adsorbents employed were a 30/60 mesh fraction and a 40/100 mesh fraction of Kaosorb. A household waxed paper containing about 20% by weight of paraffin wax was used. The waxed paper was cut into pieces about ½" square and a batch of the shreds mixed with one of the fractions of adsorbent, using 5 parts adsorbent per part of shreds. The mixture was tumbled for 10 minutes at about 250° F. in an externally fired rotary kiln while maintaining the adsorbent and shreds in intimate contact. The 30/60 mesh Kaosorb was found to separate completely from the dewaxed shreds after 5 minutes' shaking on an 8 mesh screen. On the other hand, after 20 minutes' shaking on the screen the 40/100 mesh fraction of Kaosorb could not be separated from the dewaxed shreds and the paper contained 3.6% by weight of Kaosorb.

EXAMPLE VI

This example illustrates that the mixture of adsorbent and shredded waxed paper must be agitated while in continuous contact at elevated temperature in order to reduce the wax content of the paper to a level below 1%, the accepted maximum wax content for successful reuse of the paper. The sample treated was waxed and printed bread wrapper stock containing about 27% wax and in the form of shreds about ¼" by 1" long.

Ten parts by weight of 30/60 mesh Kaosorb was tumbled for 20 minutes with 1 part by weight of the shreds at 240° F. in an externally fired rotary kiln. The mixture was then screened on a 4 mesh screen. The wax content of the product was 0.4%.

An effort was made to dewax the shreds of the bread wrapper stock by subjecting it to heat for prolonged periods while in intimate contact with 30/60 mesh Kaosorb without agitation of the mixture. The Kaosorb and paper shreds were packed into a 10" long, 3" diameter iron pipe which was sealed at one end. A cap was placed over the other end, leaving a ½" diameter opening for insertion of a thermocouple. The assembly was then placed in a preheated oven at 250° F. and allowed to remain for varying time intervals. The mixtures were screened and the wax content of the broke determined. Weight ratios of Kaosorb to waxed paper of 10/1 and 20/1 were used and contact times up to 64 hours were employed. These trials were not successful in reducing the wax level of the treated broke below 1% by weight even with storage times up to 60 hours. For example, using a 10/1 weight ratio of Kaosorb to paper and a contact time of 20 minutes, the wax content of the product was 7.3%. This figure is substantially higher than the 0.4% wax content of the product obtained in the rotary kiln at the same adsorbent to paper ratio and the same contact time.

I claim:

1. A process for treating cellulosic fiber sheets having a normally solid organic coating to separate said coating from said sheets so as to render said sheets suitable for reclamation of their cellulosic fiber content which comprises: providing fragments of said sheets which have a maximum dimension of about 2 inches and a minimum dimension of about ⅛ inch, forming a dry mixture of said fragments with a substantial quantity of granules of a solid adsorbent which are finer than said fragments and consist of particles within the range of about 20 to 80 mesh, said granules of adsorbent being present in amount such that in said mixture said fragments are suspended in a bed of said granules of adsorbent, agitating said mixture while maintaining said fragments in intimate contact with said adsorbent granules at an elevated temperature sufficient to melt said organic coating but insufficient to spontaneously char said cellulosic sheet, thereby to cause sorption of said organic coating substance on said granules of adsorbent, then separating said fragments from said granules of adsorbent utilizing the difference in particle size therebetween to effect the separation and recovering the fragments depleted or organic coating material.

2. A process for treating cellulosic fiber sheets having a normally solid organic coating to separate said coating from said sheet so as to render said sheets suitable for reclamation of their cellulosic fiber content which comprises: providing fragments of said sheets having a maximum dimension of about 2 inches, and a minimum dimension of about ⅛ inch, forming a dry mixture consisting of said fragments and granules of a solid adsorbent which are within the range of about 20 to about 80 mesh utilizing at least sufficient adsorbent to contact all surfaces of said fragments, agitating said mixture while maintaining said fragments in contact with said granules of adsorbent at a temperature sufficient to melt said organic coating but insufficient to spontaneously char said fragments, thereby to cause sorption of said organic coating substance on said granules of adsorbent, then separating said fragments from said granules of adsorbent utilizing the difference in particle size therebetween to effect the desired separation and recovering the fragments depleted of organic coating material.

3. A process for treating waxed paper to remove the wax from the paper so as to render said paper suitable for reclamation of its cellulosic fiber content which comprises: providing fragments of said waxed paper which have a maximum dimension of about 2 inches and a minimum dimension of about ⅛ inch, forming a dry mixture of said fragments with a substantial quantity of granules of a solid adsorbent material which are finer than said fragments and consist of particles within the range of about 20 to about 80 mesh, the weight of said granules of adsorbent relative to the weight of said fragments being from 1:1 to 20:1, agitating said mixture while maintaining said fragments in intimate contact with said granules of adsorbent at an elevated temperature sufficient to melt said wax but insufficient to char said fragments thereby to cause sorption of said wax by said granules of adsorbent, separating said fragments from said granules of adsorbent utilizing the difference in particle size therebetween to effect the separation and recovering the dewaxed fragments.

4. A process for treating cellulosic fiber sheets having a normally solid organic coating to separate said coating from said sheets so as to render said sheets suitable for reclamation of their cellulosic fiber content which comprises: providing fragments of said sheets which have a maximum dimension of about 2 inches and a minimum dimension of about ⅛ inch, forming a dry mixture of said fragments with a substantial quantity of granules of a solid adsorbent material which are finer than said fragments and consist of particles with the range of about 20 to about 60 mesh, tumbling said mixture while maintaining said fragments in intimate contact with said granules of adsorbent at an elevated temperature sufficient to melt said organic coating but insufficient to spontaneously char said cellulosic sheet, thereby to cause sorption of said organic coating substance on said granules of adsorbent, then screening said mixture to separate said fragments from said granules of adsorbent and recovering the fragments depleted of organic coating material.

5. A process for treating cellulosic fiber sheets having a normally solid organic coating to separate said coating from said sheet so as to render said sheets suitable for reclamation of their cellulosic fiber content which comprises: providing fragments of said sheets having a maximum dimension not greater than about 2 inches and a minimum dimension not less than about ⅛ inch, forming a dry mixture consisting of said fragments and granules of a solid adsorbent, the particles of which are within the range of about 20 to about 60 mesh, utilizing from 1 to 20 parts by weight of said adsorbent per part of said fragments, tumbling said mixture while maintaining said fragments in intimate contact with said granules of adsorbent at a temperature sufficient to melt said organic coating but insufficient to spontaneously char said fragments, thereby to cause sorption of said organic coating substance on said granules of adsorbent, then screening the mixture to separate said fragments from said granules of adsorbent and recovering the fragments depleted of organic coating material.

6. A process for treating waxed paper to separate said wax from said paper so as to render said paper amenable to reclamation of its cellulosic fiber content which comprises: providing fragments of waxed paper having a maximum dimension of about 2 inches and a minimum dimension of about ⅛ inch, forming a dry mixture consisting of said fragments and granules of a solid adsorbent which are finer than said fragments and are within the range of about 20 to about 60 mesh utilizing at least one part by weight of said granules of adsorbent to one part of said fragment, tumbling said mixture while maintaining said fragments in intimate contact with said granules of adsorbent at a temperature sufficient to melt said wax but insufficient to char said paper, thereby to cause sorption of said wax on said granules of adsorbent, screening the mixture to separate completely said fragments from said granules of adsorbent and recovering the dewaxed fragments.

References Cited in the file of this patent

UNITED STATES PATENTS

| | | |
|---|---|---|
| 577,283 | Caffall | Feb. 16, 1897 |
| 1,585,092 | Granton | May 18, 1926 |
| 1,659,401 | Kirchbraun | Feb. 14, 1928 |
| 1,986,907 | Wells | Jan. 8, 1935 |
| 2,317,038 | Ellinger | Apr. 20, 1943 |
| 2,329,785 | Pool | Sept. 21, 1943 |
| 2,581,573 | Biles | Jan. 8, 1952 |

FOREIGN PATENTS

| | | |
|---|---|---|
| 24,856 | Great Britain | Dec. 5, 1901 |